United States Patent
Ocampo

(10) Patent No.: US 6,312,127 B1
(45) Date of Patent: Nov. 6, 2001

(54) CONTACT LENS COMPRISING A VIOLET TINT

(75) Inventor: Gerardo J. Ocampo, Bridgeview, IL (US)

(73) Assignee: Wesley Jessen Corporation, Des Plaines, IL (US)

( * ) Notice: Subject to any disclaimer, the term of this patent is extended or adjusted under 35 U.S.C. 154(b) by 0 days.

(21) Appl. No.: 09/676,048

(22) Filed: Sep. 28, 2000

Related U.S. Application Data

(63) Continuation of application No. 09/149,413, filed on Sep. 8, 1998, now Pat. No. 6,183,083.

(51) Int. Cl.$^7$ ............................... G02C 7/10; G02C 7/04
(52) U.S. Cl. ............................................ 351/163; 351/162
(58) Field of Search .............................. 351/162, 160 R, 351/160 H, 161, 163, 165–166, 177; 359/361

(56) References Cited

U.S. PATENT DOCUMENTS

| | | | |
|---|---|---|---|
| 3,679,504 | 7/1972 | Wichterle | 156/62 |
| 4,405,773 | 9/1983 | Loshaek et al. | 526/318.42 |
| 4,582,402 | 4/1986 | Knapp | 351/162 |
| 4,668,240 | 5/1987 | Loshaek | 8/507 |
| 4,857,072 | 8/1989 | Narducy et al. | 8/507 |
| 4,963,159 | 10/1990 | Narducy et al. | 8/507 |
| 5,018,849 | 5/1991 | Su et al. | 351/162 |
| 5,116,112 | 5/1992 | Rawlings et al. | 351/162 |
| 5,116,684 | 5/1992 | Fretz, Jr. et al. | 428/417 |
| 5,120,121 | 6/1992 | Rawlings et al. | 351/162 |
| 5,133,745 | 7/1992 | Falcetta et al. | 623/6 |
| 5,272,010 | 12/1993 | Quinn | 428/411.1 |
| 5,292,350 | 3/1994 | Molock et al. | 8/507 |
| 5,302,978 | 4/1994 | Evans et al. | 351/162 |
| 5,414,477 | 5/1995 | Jahnke | 351/162 |
| 5,514,767 | 5/1996 | Sakashita et al. | 528/198 |
| 5,637,726 | 6/1997 | Collins et al. | 548/259 |
| 5,729,322 | 3/1998 | Collins et al. | 351/160 H |

FOREIGN PATENT DOCUMENTS

| | | |
|---|---|---|
| 0 472 496 A2 | 2/1995 | (EP) . |
| 2-262101-A | * 10/1990 | (JP) . |

OTHER PUBLICATIONS

International Preliminary Examination Report, International Application No. PCT/US99/20542, mailed Sep. 15, 2000.

* cited by examiner

Primary Examiner—Jordan M. Schwartz
(74) Attorney, Agent, or Firm—Brinks Hofer Gilson & Lione

(57) ABSTRACT

Adding a small quantity of a violet colorant to a contact lens material provides a clear contact lens that has no apparent undesirable yellow tint, such as caused by a UV-absorbing compound. Further, the violet colorant can also be used with a colored lens, in the absence of the handling tint, to mask any undesirable yellow tint, such as that produced by a UV-absorbing compound. The violet colorant will not unacceptably alter the modifying color of the colored lens.

10 Claims, No Drawings

CONTACT LENS COMPRISING A VIOLET TINT

This application is a continuation of application Ser. No. 09/149,413, filed Sep. 8, 1998, now U.S. Pat. No. 6,183,083.

BACKGROUND OF THE INVENTION

Members of the contact lens industry recognize that, on occasion, a conventional clear, colorless contact lens may include a yellow tint. The yellow tint can adversely affect consumer acceptance of the contact lens. The yellow tint can result from improper processing of the contact lens polymer, or from certain ingredients in the lens polymer. Therefore, it is sometimes difficult to predictably avoid the yellow tint in the manufacture of clear, colorless lenses.

Further, due to public concern over the potentially harmful effects of ultraviolet radiation (UV), some contact lens manufacturers have begun to add UV-absorbing compounds to contact lenses. Unfortunately, compounds that absorb UV radiation also tend to impart an undesirable yellow tint to the lenses, if the compounds are present in sufficient amounts to absorb strongly above 380 nm. Therefore, what was once an unpredictable problem may become an unavoidable problem for clear, colorless lenses that contain or are treated with a UV-absorber.

For many clear lenses, the yellow tint is not particularly troublesome because manufacturers already add a handling tint to these lenses. A handling tint is a color (usually green or blue) that is dispersed evenly throughout the lens or bonded to the lens surface in sufficient amounts to make the contact lens more easily observable for handling purposes. Typically, the amount of handling tint added will not substantially modify the wearer's eye color or affect the passage of light through the lens.

In the absence of the regular use of a handling tint, a prudent manufacturer would, nevertheless, mask a clear, UV-absorbing lens with a more desirable masking tint to hide the undesirable yellow tint imparted by the UV-absorbing compound. Handling tint and masking tints are generally made from the same or similar colorants, and in the same or similar concentrations. Therefore, for the purposes of the present disclosure, they are referred to collectively as masking tints. In addition, clear lenses that contain such traditional masking tints are referred to as tinted, clear lenses.

However, even the use of a traditional masking tint may not adequately mask the yellow tint for a clear lens. For a thicker lens, such as a toric lens, the traditional masking tint may not adequately hide the yellow color. In this case, adding enough masking tint to hide the yellow tint may also result in a substantial effect on the wearer's apparent eye color. Further, many clear lens consumers also prefer a colorless lens. For these consumers, the absence of a traditional handling tint will only highlight any yellow tint imparted by an UV-absorber or by other sources.

Moreover, in the context of a lens that is used to change the wearer's eye color (a colored lens), the yellow tint poses a substantial problem. In a colored lens, either a section of the lens or the whole lens contains sufficient color to modify a wearer's eye color (hereinafter "modifying color"). As an example, one can use the lens patented by Knapp in U.S. Pat. No. 4,582,402, which has achieved considerable consumer acceptance. In the Knapp lens, the modifying color is printed onto the contact lens as a pattern of color elements (generally dots) over the region of the lens that substantially covers the iris. However, the interstices between the color elements, and the other sections of the lens (e.g., those that cover the pupil and the sclera) remain essentially clear and colorless (occasionally, a barely visible pattern or a small pattern is printed on part of the sclera region).

For such a lens, the presence of a yellow tint, whether or not due to the addition of a UV-absorber, dramatically reduces its acceptance by consumers. Efforts to overcome the yellow tint by adding a traditional masking tint did not achieve satisfactory results because traditional masking tints tend to unacceptably alter the modifying color. In addition, efforts to mask the yellow tint in colored lenses did not predictably alter the appearance of the lens. For example, a colored lens containing both an UV-absorber and a masking tint will modify the lens appearance in a different way than the same lens that does not contain the UV-absorber.

Blue or green are the traditional colors for masking tints because they have achieved general acceptance by consumers. Although violet pigments have been used in other contexts for contact lens (e.g., as a modifying color or part of a modifying color pattern, and for the small, barely visible printing on the sclera of a color lens), violet has not been used as a masking tint. By itself, and at higher concentrations, a violet masking tint tends to impart a darker appearance to the contact lens. At even higher concentrations, the violet color will adversely modify the wearer's eye color. Contact lens manufacturers do not believe a contact lens that contains such concentrations of violet tint can achieve consumer acceptance.

Nevertheless, it would be desirable, especially in the context of adding an UV-absorbing compound, to formulate a lens wherein the presence of yellow tint can be effectively masked. It would be especially desirable to mask the yellow tint in a colored lens without adversely altering the modifying colors.

SUMMARY OF THE INVENTION

Surprisingly, addition of a violet colorant to a clear lens in an amount sufficient to mask the effect of the yellow tint will not affect consumer acceptance, if it is used in small amounts. In one aspect of the invention, the violet colorant is used to mask the effect of the yellow tint caused by the presence of an UV-absorber in a clear colorless lens. In a second aspect of the invention, the violet colorant is combined with a traditional masking tint in a tinted, clear lens to mask the effect of yellow tint caused by the presence of an UV-absorber. In a third aspect, sufficient amounts of the violet tint can be used to mask yellow tint in a colored lens without affecting consumer acceptance, provided the amount used is sufficiently small to avoid altering the appearance of the lens.

In these lenses, the concentration of violet colorant must be carefully monitored to avoid noticeably altering the lens appearance. In other words, when the amount of violet colorant in the lens is carefully balanced between an amount sufficient to mask the effect of the yellow tint and an amount that is not substantially noticeable, the violet colorant can be used for a clear colorless lens, a tinted clear lens, or a colored lens. In such a concentration, the violet colorant can be used to hide yellow tint caused by the presence of an UV-absorber without adversely affecting consumer acceptance of the lens. The resulting lenses, which include the proper amount of violet colorant to mask the yellow tint caused by UV absorbing compounds, are cosmetically indistinguishable from a lens without the UV absorber.

DETAILED DESCRIPTION OF THE INVENTION

In the context of this invention, although some terms are referred to in the singular, it is understood that such references may also encompass the plural. For example, although color is referred to in the singular, it is understood that some colors comprise many color components. Further, it is understood that a colored lens is used to modify the wearer's eye color, and that eye color, in fact, refers to the color of the iris. Furthermore, the term "tint" refers to the even dispersion of colorant in the lens. Moreover, all percentages are based on weight percentages unless otherwise specified. Finally, all references cited herein are incorporated by reference.

It has been found that adding a violet colorant to a contact lens can effectively hide the presence of an undesirable yellow tint in the lens. Moreover, it is possible to overcome any undesirable appearance normally associated with the violet colorant when the amount added is sufficiently small to avoid notice by the consumer. For a clear, colorless lens, an amount of violet colorant sufficient to mask the yellow tint may be evenly dispersed in the lens so as to be unnoticeable.

In a similar manner, the amount sufficient to mask the yellow tint can also be evenly dispersed in a tinted, clear lens. In such a lens, the violet colorant hides the yellow tint regardless of the thickness of the lens. Moreover, for the tinted, clear lens, the violet colorant concentration need not be as carefully monitored because the traditional masking tints also hide the darker appearance normally associated with the violet colorant. In combination, the two tints mask the effect of the yellow tint and at the same time impart a commercially acceptable appearance to the contact lens.

However, one cannot conclude that a violet colorant will have no effect on a tinted, clear lens. When too much violet colorant is used, a colorless lens that contains both the masking tint and the violet tint will appear darker than one that contains only the masking tint in a direct comparison. However, without the direct comparison, an average consumer will not notice the effect of the violet colorant.

For a colored lens, the violet colorant also effectively hides the yellow tint and/or its adverse effect on the modifying color of the colored lens. As in the case of the clear, colorless lens, the amount of violet colorant used can be monitored carefully so that the consumer does not notice it. Further, like the tinted, clear lens, the concentration of the violet colorant need not be as carefully monitored as for the clear colorless lenses. At smaller concentrations of violet colorant, the modifying color effectively produces the illusion that the violet tinted contact lens does not have the darker appearance normally associated with the violet colorant. Once again, in a direct comparison, the ordinary wearer would probably observe that the colored lens with the violet colorant is darker than the colored lens without the violet colorant. However, without the direct comparison, the ordinary wearer would probably not notice the difference. In this manner, the violet colorant is generally compatible with the modifying color.

It is apparent that determining whether a sufficient amount of violet tint, or violet colorant, is present to hide yellow tint, and whether the amount of violet colorant is sufficiently small so that it is not readily apparent to an ordinary observer, requires some experimentation. However, in the context of this invention and the cosmetic contact lens industry, such determinations through, e.g., focus groups, do not constitute an undue burden. An amount of violet colorant sufficient to mask yellow tint is an amount that, when added to a lens that otherwise manifests a yellow tint, prevents the ordinary wearer from noticing the yellow tint. In other words, the ordinary observer would deem the masked lens to be cosmetically indistinguishable from a lens having neither the yellow tint-causing agent, nor the masking agent. Conversely, a sufficiently small amount of violet colorant is one that, without a direct side-by-side comparison with another lens, will not appear to the ordinary wearer to have a violet tint.

A UV-absorbing contact lens that is cosmetically indistinguishable from a lens without a UV-absorbing compound may be made in accordance with this invention. This lens is made by adding a UV-absorbing compound to a contact lens formulation in sufficient amounts that would cause a yellow tint to result in a conventional contact lens formulation; and then adding a violet colorant to the formulation in sufficient amounts to mask the yellow tint that would otherwise be present without the violet colorant, such that the contact lens is cosmetically indistinguishable from a lens without the UV-absorbing compound. Also, this lens may be made by adding a UV-absorbing compound to a contact lens formulation in an amount sufficient to cause a yellow tint, adding violet colorant to the formulation in an amount sufficient to mask the yellow tint caused by the presence of the UV-absorbing compound; and polymerizing the formulation and forming the polymer into a contact lens.

The method also may include titrating the contact lens formulation containing the UV-absorbing compound and determining the amount of violet colorant added when the yellow tint has been masked. This is particularly useful when an amount of UV-absorber has been added to the formulation, and the yellow tint is readily apparent. For example, a yellow tint is readily apparent in a contact lens formulation that includes more than about 1% by weight dry basis of a UV-absorber such as 2-(2'-hydroxy-3'-tert-butyl-5'-(3"-(4'"-vinylbenzoxy)propoxy)phenyl)-5-methoxy-2H-benzotrizole, and the like, which are described more fully in U.S. Pat. No. 5,729,322 to Collins and Mulvihill. This yellowish tint may also be apparent when less amounts of this class of UV-absorbing compound are used.

Generally, however, it is desirable to use at least about 0.9% by dry weight basis of this type of UV-absorber to obtain the desired levels of UV absorption, depending on the thickness of the lens. Therefore, the use of carbazole violet in accordance with this invention may be desirable over a broader range of amounts of UV-asbsorber for manufacturing consistency and efficiency, rather than testing lenses on an individual basis for its yellowish tint.

The practice of this invention is not dependent on the particular contact lens used, the particular color used, or any particular method of manufacturing a contact lens. The only important detail is that a small quantity of a violet colorant can be added to contact lens to mask any undesirable yellow tint that may result from a number of reasons, including the addition of a UV-absorber to the contact lens. Another further detail is that the amount of violet colorant added is that sufficient to mask yellow tint, but sufficiently small to avoid notice by the average consumer. Details such as the formulation and production of the contact lenses, the formulation and production of the modifying colors and the methods of combining the modifying colors with the contact lenses are known to artisans of the contact lens industry. The following details are provided to illustrate the invention, and do not limit the scope of the invention.

The preferred lenses contain modifying colors in the form a pattern of color elements that are dots, as taught in U.S. Pat. Nos. 4,582,402 to Knapp, and 5,414,477 to Jahnke. However, in the context of this invention, the dots need not be opaque. For a lens used with a dark colored iris, the dots are preferably opaque dots. For a lens used with a light colored iris, the dots can be either opaque or non-opaque.

In the present invention, the color elements can be applied to a variety of contact lenses, on the anterior (away from eye) or posterior (in contact with eye) surface, or formulated within the contact lens. In a preferred lens, the pattern is applied to the anterior surface. On a hard contact lens, the outer periphery of the pattern lies at substantially the edge of the contact lens. On a soft contact lens, the outer periphery of the pattern may be surrounded by a non-opaque sclera section. The preferred contact lenses are disclosed in U.S. Pat. Nos. 4,405,773 and 4,668,240 both to Loshaek. Other examples of lenses with color modifying elements are disclosed in U.S. Pat. Nos. 4,857,072 and 4,963,159 both to Narducy et al., and 5,272,010 to Quinn.

Methods of making contact lenses that have a color pattern are known to the ordinary artisan. The preferred methods of producing contact lenses having the pattern of the present invention are described in U.S. Pat. Nos. 4,582,402 to Knapp, and 5,414,477 to Jahnke. Other examples of methods of producing colored contact lenses are described in U.S. Pat. Nos. 3,679,504 to Wichterle, 5,018,849 to Su et al., 5,302,978 to Evans et al., 5,120,121 to Rawlings et al., and 5,166,122 to Rawlings, and European Patent Publication No. 0 472 496 A2. Contact lenses that contain UV-absorbers are known in the art. As an example, one can use the UV-absorber disclosed in U.S. Pat. No. 5,637,726 to Collins et al., in the amounts disclosed.

For a clear lens, it is preferred to use violet colorant in an amount between about 0.0001% and about 0.01% on a dry weight (before lens is hydrated and before diluent and/or saline is added) basis to mask the yellow tint. More preferably, between about 0.002% and about 0.009% is used.

For a colored lens, it is preferred to use violet colorant in an amount between about 0.0001% and about 0.01% on a dry weight basis to mask the yellow tint. More preferably, between about 0.004% and about 0.009% is used.

Of course, the exact amount depends on the strength of the yellow tint otherwise present from the UV absorber added to the lens, and the type of violet colorant used to mask the yellow tint. Carbazole violet, and Pigment Violet Nos. 1, 14, 15 16, 19 and 32 are examples of just a few violet colorants that may be useful in the present invention. These pigments can be used in combination. Also, a dispersion containing blue and red pigments may be made and added to the monomer mixture.

In addition, up to about 0.003 wt % (dry weight basis) of a handling tint, such as phthalocyanine green and the like, more preferably about 0.002 wt %, may be used in combination with the violet colorant, depending on the tint level desired and the amount of yellow tint to be masked.

EXAMPLES

Example 1

Colored contact lenses were made according to the following formulations:

TABLE 1

| Ingredient | A (Solids) | B (Total) | (Solids) |
|---|---|---|---|
| HEMA | 86.44% | 49.62% | 85.70% |

TABLE 1-continued

| Ingredient | A (Solids) | B (Total) | (Solids) |
|---|---|---|---|
| EOEMA | 9.81 | 4.97 | 8.58 |
| EDMA | — | 1.20 | 2.07 |
| MAA | 1.80 | 0.81 | 1.40 |
| BZT*** | 1.50 | 0.82 | 1.42 |
| Carbazole Violet | 0.40* | 0.20** | 0.35** |
| Vazo 52 | 0.05 | 0.28 | 0.48 |
| IPA | — | 42.10 | — |
| Total | 100.00% | 100.00% | 100.00% |

*A 1/99 w/w dispersion of carbazole violet in HEMA
**A 2.5/97.5 w/w dispersion of carbazole violet in HEMA
***UV absorber: 2-(2'-hydroxy-3'-tert-butyl-5'-(3"-(4'''-vinylbenzoxy)propoxy)phenyl)-5-methoxy-2H-benzotrizole Example 2

Colored contact lenses were also made according to the following formulations:

TABLE 2

| Ingredient | A (Total) | (Solids) |
|---|---|---|
| HEMA | 49.491% | 85.476% |
| EOEMA | 4.97 | 8.584 |
| EDMA | 1.20 | 2.073 |
| MAA | 1.059 | 1.829 |
| BZT** | 0.82 | 1.416 |
| Carbazole Violet | 0.080* | 0.138* |
| Vazo 52 | 0.28 | 0.484 |
| IPA | 42.10 | — |
| Total | 100.00% | 100.00% |

*A 2.5/97.5 w/w dispersion of carbazole violet in HEMA
**UV absorber: 2-(2'-hydroxy-3'-tert-butyl-5'-(3"-(4'''-vinylbenzoxy)propoxy)phenyl)-5-methoxy-2H-benzotrizole Example 3

Contact lenses with a handling tint may be made according to the following formulations:

TABLE 3

| Ingredient | A (Solids) | B (Total) | (Solids) |
|---|---|---|---|
| HEMA | 86.41% | 49.57% | 85.62% |
| EOEMA | 9.81 | 4.97 | 8.58 |
| EDMA | — | 1.20 | 2.07 |
| MAA | 1.80 | 0.81 | 1.40 |
| BZT*** | 1.50 | 0.82 | 1.42 |
| Carbazole Violet | 0.40* | 0.23* | 0.40* |
| Phthalocyanine Green | 0.03** | 0.02** | 0.03** |
| Vazo 52 | 0.05 | 0.28 | 0.48 |
| IPA | — | 42.10 | — |
| Total | 100.00% | 100.00% | 100.00% |

*A 1/99 w/w dispersion of carbazole violet in HEMA
**A 6.98/93.02 w/w dispersion of phthalocyanine green in HEMA
***UV absorber: 2-(2'-hydroxy-3'-tert-butyl-5'-(3"-(4'''-vinylbenzoxy)propoxy)phenyl)-5-methoxy-2H-benzotrizole

Example 4

Clear lenses may be made according to the following formulations:

TABLE 4

| Ingredient | A |
| --- | --- |
| HEMA | 52.786% |
| EOEMA | 5.727 |
| Carbazole Violet | 0.200* |
| IPA | 37.00 |
| EDMA | 1.618 |
| MAA | 1.057 |
| Vazo-52 ™ | 0.336 |
| Lupersol-256 ™ | 0.331 |
| UV-Absorber | 0.945 |
| TOTAL | 100.00% |

*A 1/99 w/w dispersion of carbazole violet in HEMA

Example 5

Colored lenses may be made by applying the modifying colors to the contact lenses made according to Examples 1 and 2 by using any known method. One such method is disclosed in U.S. Pat. No. 4,582,402, to Knapp. Typically, the modifying colors cover between about 15% and about 50% of the lens portion covering the wearer's iris. The carbazole violet in the lens masks the yellowish tint otherwise present from the UV-absorber so as to not affect the cosmetic appearances of the modified color of the eye.

Formulations of the most preferred ink pastes for the modifying colors are:

TABLE 5

| | Color | | | |
| --- | --- | --- | --- | --- |
| Ingredient | Green | Blue | Aqua | Violet |
| Ethyl Lactate | 31.35% | 22.50% | 22.50% | 22.50% |
| Polymer Soln. | 65.33% | 76.00% | 76.01% | 76.00% |
| PCN Blue | —% | 1.50% | 0.29% | —% |
| PCN Green | 0.90% | —% | 1.20% | —% |
| Carbazole Violet | —% | —% | —% | 1.50% |
| Hydrophobic FeO | 2.42% | —% | —% | — |
| Total | 100.00% | 100.00% | 100.00% | 100.00% |

To produce the preferred ink paste, the ingredients are mixed in a grinding media. For 651 gram and 3000 gram samples of ink paste, 850 grams and 4298 grams of grinding media are used, respectively. The target viscosity of the polymer solutions are about 35,000 CPS for each formulation, except for the green color which has a target viscosity of about 50,000 CPS. The polymer solutions are known in the art, and may also include binding polymers to fix the color to the contact lenses.

Results

An internal focus study demonstrated that a UV-absorbing clear lens that contained the violet tint, such as made according to example No. 1, achieved 100% concordance with existing acceptable products.

The described embodiments are to be considered in all respects only as illustrative and not restrictive, and the scope of the invention, therefore, is indicated by the appended claims rather than by the foregoing description. All changes that come within the meaning and range of equivalency of the claims are to be embraced within their scope.

I claim:

1. A clear contact lens comprising:
   a) a UV absorbing compound present in an amount greater than about 0.9 wt % dry basis sufficient to cause a noticeable yellow tint in a conventional clear contact lens, and
   b) an amount of violet colorant greater than about 0.0001 wt % dry basis sufficient to mask the yellow tint so as to make the color of the lens cosmetically indistinguishable from a clear contact lens without said UV absorbing compound.

2. The lens of claim 1, wherein the violet colorant is carbazole violet.

3. The lens of claim 1 having between about 0.0001 wt % and about 0.01 wt % dry basis violet colorant.

4. The lens of claim 3 having between about 0.002 and 0.009 wt % dry basis violet colorant.

5. The lens of claim 1 having at least about 1 wt % dry basis UV-absorbing compound.

6. A tinted contact lens comprising a handling tint, in an amount less than 0.003 wt % dry basis, a UV-absorbing compound in an amount greater than about 0.09 wt % dry basis that would be sufficient to cause a noticeable yellow tint, and an amount of violet colorant greater than about 0.0001 wt % dry basis sufficient to mask the yellow tint otherwise caused by the presence of the UV-absorbing compound.

7. The lens of claim 6, wherein the violet colorant is carbazole violet.

8. The lens of claim 6 having between about 0.0001 wt % and about 0.01 wt % dry basis violet colorant.

9. The lens of claim 8 having between about 0.004 and about 0.009 wt % dry basis violet colorant.

10. The lens of claim 6 further comprising at least about 1 wt % dry basis UV-absorbing compound.

* * * * *